US United States Patent Office 3,847,955
Patented Nov. 12, 1974

3,847,955
1,24,25-TRIHYDROXYCHOLECALCIFEROL
Hector F. De Luca, Madison, Wis., assignor to Wisconsin Alumni Research Foundation, Madison, Wis.
No Drawing. Filed July 16, 1973, Ser. No. 379,621
Int. Cl. C07c 169/48, 171/08
U.S. Cl. 260—397.2                 1 Claim

ABSTRACT OF THE DISCLOSURE 1,24,25-trihydroxycholecalciferol and methods for preparing same. This compound is caracterized by antirachitic activity and its ability to induce intestinal calcium transport.

---

The invention described herein was made in the course of work under a grant or award from the Department of Health, Education, and Welfare.

During the past several years various derivatives of vitamin D have been discovered and an insight into the mechanism of their biological activity has been reasonably established. For example, 25-hydroxycholecalciferol (U.S. Letters Patent No. 3,565,924) appears to be the circulating form of vitamin $D_3$ in the blood of animals in a normal physiological state. According to Blunt et al. (1968), Biochemistry, 7, 3317–3332 and Horsting et al. (1969), Biochem. Biophys. Res. Commun., 36, 251–256, vitamin D after administration to an animal in a normal physiological state is first hydroxylated on carbon 25 in the liver before traveling to the kidney to be hydroxylated on either carbon 1 (see Fraser et al. (1970), Nature, 228, 764–766; Holick et al. (1971), Proc. Acad. Sci. U.S.A. 68, 803–804; Holick et al. (1971), Biochemistry 10, 2799–2804; Lawson et al. (1971), Nature 230, 228–2330) or carbon 24 (see Omdahl et al. (1972), Nature (New Biology), 2237, 63–64; Holick et al. (1972), Biochemistry, 11, 4251–4255. Under hypocalcemic or hypophosphatemic conditions the kidney produces 1,25-dihydroxycholecalciferol (see Boyle et al. (1971), Proc. Nat. Acad. Sci. U.S.A. 68, 2131–2134 and Tanaka et al. (1973), Arch. Biochem. Biophys. 154, 566–574. See also U.S. Letters Patent No. 3,697,559. Under conditions of normal calcemia, hypercalcemia and hyperphospatemia the kidney limits the production of 1,25,dihydroxycholecalciferol and synthesizes 24,25-dihydroxycholecalciferol instead (see Boyle and Tanaka supra. See also U.S. Letters Patent No. 3,715,374). It has now been demonstrated that under normal or hypercalcemic conditions the major circulating metabolite of 25-hydroxycholecalciferol is 24,25-dihydroxycholecalciferol and that this compound is metabolized further in the kidney. (See Boyle supra and Boyle et al. (1973), J. Biol. Chem. in press.)

This application relates to such further metabolite which has now been identified as 1,24,25-trihydroxycholecalciferol (1,24,25-$(OH)_3D_3$). This compound is characterized by some antirachitic activity and its preferential action in stimulating and sustaining intestinal calcium transport.

The physical data recited in the following discussion were obtained as follows:

Radioactive determinations were carried out with a Packard Tri-Carb Model 3375 liquid scintillation counter equipped with an automatic external standardization system. Samples were dried in 14 x 45 mm. glass vial inserts with a stream of air and dissolved in 4 ml. of toluene counting solution (2 g. 2,5-diphenyloxazole and 0.1 g. of 1,4-bis[2-methyl-5-phenyloxazolyl)benzene] per 1 liter of toluene and counted. Ultraviolet absorption spectra were recorded with a Beckman DB-G spectrophotometer. Samples were dissolved in ethanol and a molar extinction coefficient of 18,000 was used. Mass spectrometric determinations were carried out with an Associated Electrical Industries MS–9 mass spectrometer using a direct probe inlet at temperatures of 120–150° C. above ambient. All solvents used were of reagent grade and those utilized for chromatography in the later stages of the isolation of the metabolite were doubly distilled before use.

PREPARATION OF 1,24,25-$(OH)_3D_3$ FROM CHICKEN KIDNEY HOMOGENATES

One-day old white leghorn cockerel chicks obtained from Northern Hatcheries (Beaver Dam, Wis.) were kept in cages at 38° C. and fed *ad libitum* for four weeks on a corn-soy protein rachitogenic diet as described by Omdahl et al., Biochemistry, 10, 2935 (1971). At the end of the four weeks the animals were killed, their kidneys removed and placed in a buffer solution at 0° (pH 7.4 montaining 14 mM. tris acetate (trihydroxymethylaminomethane acetate), 0.19 M sucrose, 1.87 mM. magnesium acetate and 5 mM. succinate at 4° (Gray et al., J. Biol. Chem., 247, 7528–7532). The kidneys were teased apart to remove any extraneous connective tissue as well as testes. The kidney tissue (1 part) was homogenized with 9 parts of the buffer solution with three strokes in a Potter-Elvehjem homogenizer. The homogenate (1.5 ml.) was placed in a 25 ml. Erlenmeyer flask and then flushed for 1 min. wtih 100% oxygen. 24,25-$(OH)_2$-[26,27-$^3$H]$D_3$ (0.5 μg.) (the 24,25-$(OH)_2D_3$ was prepared as shown in Holick et al., Biochemistry, 11 4251–4255 (1972)) (specific activity 120,000 d.p.m./μg. was then added to the homogenate in 10 μl. of 95% ethanol. The vessel was placed in a water shaker at 37° for 30 min. At the end of the 30 min., 33 ml. of methanol (2 parts) was added to each of the flasks to stop the reaction. Flask contents were combined and chloroform was added for phase separation as described in Holick et al., Biochemistry, 11, 4251–4255 (1972) and Gray et al. supra. (A total of 50 μg. of 24,25-$(OH)_2D_3$ was incubated in 100 separate flasks.)

After extraction the resulting yellow residue (2 g.) was dissolved in 1.5 ml. of 75:23:2 chloroform:Skellysolve B (petroleum ether fraction redistilled at 67–69° C.): methanol and applied to a 2 x 30 cm. glass column containing 15 g. of Sephadex LH–20 (a hydroxypropyl ether derivative of Sephadex G–25 from Pharmacia Corp. Piscataway, N.J.) according to the procedure of Frolik and De Luca, J. Clin. Invest., 51, 2900–2906 (1972) and Holick and De Luca, J. Lipid Res., 12, 460–465 (1971). Sixty 3.4 ml. fractions were collected and 1 μl. of each fraction was used for tritium determinations. The elution profile from the column (a plot of radioactivity vs. fraction number based upon volume of solvent effluent from the column—see for example Holick et al., J. Lipid Res., 12 supra) showed two major peaks. The first of these was determined to represent 24,25-dihydroxycholecalciferol and the second, referred to as peak $VI_b$, was believed to contain the trihydroxy compound (metabolite) of this invention. The peak $VI_b$ region (tubes 35–45) was combined and dried under nitrogen to yield 20 μg. of the metabolite in 500 mg. of a clear oily residue. This residue was dissolved in 100 μl. of methanol and applied to a 1 x 100 cm. glass column packed to a height of 96 cm. with Sephadex LH–20 in methanol. Sixty 1.3 ml. fractions were collected and 1μl. of each fraction was used for tritium determination to reveal the elution position of the metabolite. The contents of the peak tubes (39–45) were combined, and dried under nitrogen to give 18 μg. of the metabolite in less than 1 mg. of a clear lipid. The sample was dissolved in methanol and used for ultraviolet absorption spectrophotometry. The ultraviolet absorption spectrum for the sample demonstrated approximately 100 absorbance units with a $\lambda_{max}$ at 275 and a $\lambda_{min}$ at 265 nm. This sample was dissolved in 0.1 ml. of 75:23:2 chloroform:Skellysolve B:methanol and applied to a 1 x 150 cm. glass column packed with BioBeads SX-8 (a polystyrene resin produced by Bio-Rad Corp., Richmond, Calif.), to a height of 148 cm. in the same solvent as previously described (5, 8). Sixty 1.3 ml. fractions were collected and 1μl. of each fraction was used for tritium determination. The peak fractions (43–46) were dried under nitrogen and then redissolved in methanol and used for ultraviolet absorption spectrophotometry. Based on the ultraviolet absorption spectrum it became clear that the major contaminant migrated 1 tube later than the metabolite. Tube 46, which contained a major amount of the contaminant, was removed from the sample and the rest of the peak tubes were combined and reapplied to the same column. This procedure was repeated three more times and the final product (13 μg.) contained about 3 absorbance units with a $\lambda_{max.}$ at 275 and a $\lambda_{min.}$ at 265 nm. Because of the limited amount of material available it was necessary to develop two new chromatographic systems to separate the metabolite from the remaining contaminants. The sample was dissolved in 100 μl. of 75:25 chloroform:Skellysolve B and applied to a 1 x 60 cm. column containing 12 g. of Sephadex LH-20, slurried and developed in the same solvent. The metabolite which eluted betwen 215–273 ml. was dried under nitrogen, redissolved in methanol and its ultraviolet absorption spectrum taken. The ultraviolet absorption spectrum sill demonstrated a $\lambda_{max.}$ 275 and a $\lambda_{min.}$ at 265 nm., but about 50% of the ultraviolet absorbance had been removed with this chromatographic technique. The sample was then dissolved in 65:35 chloroform:Skellysolve B and applied to a 1 x 60 cm. glass column containing 15 g. of a phenyl hydroxyethyl derivative of Sephadex LH-20 (Elingbal et al., J. Lipid Res., 11, 266–273 (1970)) slurried and developed in the same solvent. The metabolite which eluted between 195–225 ml. was used for mass spectrometry, ultraviolet absorption spectrophotometry and biological actiivty measurements.

CHEMICAL MODIFICATIONS OF THE METABOLITE

Periodate oxidation.—The metabolite (1 μg.) was dissolved in 30 μl. of methanol and treated with 20μl. of a 5% aqueous solution of sodium metaperiodate. After 4 hours at 22°, 50 μl. of methanol was added to the reaction mixture and the sample was applied to a 0.8 x 30 cm. glass column containing 5 g. of Sephadex LH-20 in methanol. One ml. fractions were collected and the product was found in fraction number 8.

Trimethylsilylation of 1,24,25-$(OH)_3D_3$.— The metabolite (1 μg.) was dissolved in 15 μl. of pyridine and reacted with 10 μl. of TBT (a special combination of trimethylsilylimidazole, bistrimethylsilylacetamine and trimethylchlorosilane, Pierce Chemical Co., Rockford, Ill.) at 22° C. for 15 min. The reaction mixture was purified on a 0.8 x 30 cm. Sephadex LH-20 column developed in methanol as described above.

IDENTIFICATION OF THE METABOLITE AS 1,24,25-$(OH)_3D_3$

The ultraviolet absorption spectrum of the metabolite $\lambda_{max.}$ 265 nm. was similar to those previously reported for the 5,6-cis triene system of vitamin D and its metabolites (see Bluent et al., Biochemistry, 7, 3317–3322 (1968) and Holick et al., Proc. Nat. Acad. Sci., 68, 803–804 (1971); Biochemistry, 10, 2799–2804; Biochemistry, 11, 4251–4255). The mass spectrum of the metabolite and its trimethylsilyl ether derivative showed molecular ion peaks at m/e. 432 and 720, respectively, demonstrating that an additional hydroxyl function had been incorporated into 24,25-$(OH)_2D_3$ (M=416). Furthermore the peaks m/e 287, 269 (287-$H_2O$) and 251 (287-$2H_2O$) in the mass spectrum of the metabolite which arises from the loss of the entire side chain ($C_{17}$–$C_{20}$ cleavage) confirmed the lack of an additional hydroxyl function on the side chain. The fragments of m/e 152 and 134 (152-$H_2O$) (due to ring A plus $C_6$ and $C_7$) in the mass spectrum of the metabolite and the corresponding fragments of m/e 296 and 206 (296 minus the trimethylsilyl group) in the mass spectrum of its trimethylsilyl derivative were observed also in the mass spectra of 1,25-$(OH)_2D_3$ and its trimethylsilyl ether derivative and established an additional oxygen function in ring A. The compelling evidence for the 5,6-cis triene system ($\lambda_{max.}$ 265 for the metabolite) eliminated carbon 6 and carbon 7 as possible sites for hydroxyl substitution.

Treatment of the metabolite with periodate provided essential information. The mass spectrum of the periodate product showed a molecular ion peak at m/e 372 corresponding to a C-24 aldehyde which results from the C-24, C-25 periodate cleavage. This demonstrated that the 24, 25-hydroxyl functions are present in the metabolite. Furthermore peaks at m/e 152 and 134 firmly established that the additional hydroxyl function in ring A must be on carbon 1 since an additional hydroxyl function on either C-4 or C-2 would be vicinal to the hydroxyl on carbon 3 and thus be sensitive to periodate oxidation. These data firmly establish that the additional oxygen function is on carbon 1 and therefore the structure of this metabolite is 1,24,25-$(OH)_3D_3$.

BIOLOGICAL ACTIVITY

Antirachitic Activity of 1,24,25-$(OH)_3D_3$, 1α,25-$(OH)_2D_3$ and Vitamin $D_3$ Rats were fed a high calcium (1.2) low phosphorus (0.3%) diet for 3 weeks prior to the experiment. They were divided into 4 groups of 8 rats. Each rat in the control group received 0.5 ml. 95% EtOH, each rat in another group received 4 IU of vitamin $D_3$, and each animal in the other groups received 6.5 pmoles of either 1,24,25-$(OH)_3D_3$ or 1,25-$(OH)_2D_3$ in 0.05 ml. 95% EtOH intraperitoneally every 24 hours for 5 days. After an additional 2 days the rats were killed and used for antirachitic assay by the line test method (U.S. Pharmacopoeia, Mack Publishing Co., Easton, Pa., 1955). The results obtained are shown in the table below.

TABLE 1

| Compound: | Antriachitic activity (IU/μg.) |
|---|---|
| EtOH | 0 |
| Vitamin $D_3$ | 40 |
| 1,25-$(OH)_2D_3$ | 400 |
| 1,24,25-$(OH)_3D_3$ | 24 |

Intestinal Calcium Transport

Weanling male rats (Holtzman Co., Madison, Wis.) were housed in over-hanging wire cages and fed the adequate calcium and phosphorus, vitamin D-deficient diet for two weeks and for an additional week the low calcium (0.02%), vitamine D-deficient diet as described in Holick et al., Biochemistry, 11, 2715–2719 (1972). At the end of the third week the rats were approximately 100–110 g. and had an average serum calcium concentration of 4.5 mg./100 ml.

Groups of six rats received either 62.5 pmoles of 1,25-$(OH)_2D_3$ or 1,24,25-$(OH)_3D_3$ intrajugularly in 0.05 ml. of 95% ethanol while the controls received only EtOH. At the desired time after administration, the animals were decapitated and the blood and duodena were collected. The duodena were prepared according to the procedure of Martin and De Luca, Arch. Biochem. Biophys., 134, 139–148 (1969) for measuring intestinal calcium transport activity by the everted gut sac technique. Samples from both the inside and outside (100 μl.) of the intestinal sac were spotted on filter paper disks, dried and placed in 20 ml. counting vials containing 10 ml. of scintillation counting solution.

Results obtained showed that 62.5 pmoles of 1,24,25-$(OH)_3D_3$ is capable of eliciting an intestinal calcium transport response six hours after administration and a maximum response at 18 hours. 1,25-$(OH)_2D_3$ (62.5 pmoles) on the other hand showed a maximum response in 6 hours and was more active on a weight basis during the entire time observed.

Bone Calcium Mobilization

The blood from the rats was centrifuged and 0.1 ml. of serum was mixed with 1.9 ml. of 0.1% lanthanum chloride solution. Serum calcium concentration was determination with a Perkin-Elmer atomic absorption spectrometer Model 403.

The 1,24,25-$(OH)_3D_3$ induced a small but significant rise in serum calcium (increase of 0.5 mg. percent) presumably due to bone calcium mobilization at 24, 48 and 72 hours but at 96 hours was down to control levels. In comparison 1,25-$(OH)_2D_3$ showed a rapid response with a marked rise in serum calcium (increase of 2 mg. percent) with a sustained 1 mg. percent increase for 72 hours after which there was a drop to control levels.

Thus 1,24,25-$(OH)_3D_3$ was observed to about (60% as effective as vitamin $D_3$ in the cure of rachitic lesions and is preferentially more active in inducing intestinal calcium transport than in mobilizing calcium from bone. This indicates that 1,24,25-$(OH)_3D_3$ may be a preferred agent for use in chronic renal disease to induce transport and absorption of calcium in the intestine without dissolution of bone, particularly under circumstances where 1,25-$(OH)_2D_3$ is not available or its use is contra-indicated.

Having thus described the invention what is claimed is:
1. 1,24,25-trihydroxycholecalciferol.

References Cited
UNITED STATES PATENTS

| | | | |
|---|---|---|---|
| 3,715,374 | 2/1973 | De Luca | 260—397.2 |
| 3,739,001 | 6/1973 | De Luca | 260—397.2 |
| 3,565,924 | 2/1971 | De Luca | 260—397.2 |

ELBERT L. ROBERTS, Primary Examiner